(12) United States Patent
Hung

(10) Patent No.: US 11,125,382 B2
(45) Date of Patent: Sep. 21, 2021

(54) SUPPORT ARM DEVICE

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/998,585

(22) Filed: Aug. 20, 2020

(65) Prior Publication Data
US 2021/0062968 A1 Mar. 4, 2021

(30) Foreign Application Priority Data
Sep. 4, 2019 (TW) .................. 108131911

(51) Int. Cl.
*F16M 13/02* (2006.01)

(52) U.S. Cl.
CPC ..... *F16M 13/022* (2013.01); *F16M 2200/022* (2013.01); *F16M 2200/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,880,193 | A * | 11/1989 | Warshawsky | F21S 6/003 248/122.1 |
| 7,195,215 | B2 * | 3/2007 | Lin | F16M 11/2014 248/125.9 |
| 7,389,965 | B2 * | 6/2008 | Oddsen, Jr. | F16M 11/10 248/274.1 |
| 7,546,991 | B2 * | 6/2009 | Wang | F16M 11/08 248/125.1 |
| 8,366,060 | B2 * | 2/2013 | Hung | F16M 11/041 248/124.1 |
| 9,599,276 | B2 * | 3/2017 | Grziwok | F16M 11/2014 |
| 10,154,729 | B2 * | 12/2018 | Blackburn | A47B 21/02 |
| 10,400,946 | B2 * | 9/2019 | Bennett | F16M 11/08 |
| 10,436,244 | B2 * | 10/2019 | Hung | F16M 11/2092 |
| 10,851,938 | B2 * | 12/2020 | Glickstein | F16M 11/16 |
| 2006/0261228 | A1 * | 11/2006 | Hung | F16M 11/10 248/282.1 |
| 2007/0040084 | A1 * | 2/2007 | Sturman | F16M 11/041 248/280.11 |
| 2017/0150817 | A1 * | 6/2017 | Hung | A47B 97/001 |

* cited by examiner

*Primary Examiner* — Monica E Millner

(57) ABSTRACT

A support arm device includes a shaft, a sleeve that is sleeved rotatably on the shaft, and a replaceable limiting member that is disposed detachably and movably between the shaft and the sleeve for limiting rotational angle range of the sleeve relative to the shaft. When the length of the limiting member is increased, the rotational angle range is reduced. Upon detachment of the limiting member, the sleeve is rotatable freely relative to the shaft.

10 Claims, 12 Drawing Sheets

SUPPORT ARM DEVICE

CROSS-REFERENCE TO RELATED APPLICATION

This application claims priority of Taiwanese Invention Patent Application No. 108131911 filed on Sep. 4, 2019.

FIELD

The disclosure relates to a support arm device, more particularly to a support arm device for suspension of an object.

BACKGROUND

Referring to FIG. 1, a conventional supporting arm device 1 disclosed in Chinese Utility Model Patent No. 2768153 includes an extension arm 11 and a suspension arm 12 pivotally connected to the extension arm 11. The extension arm 11 includes a sleeve 111 formed at one end thereof and a protruding block 112 formed in an inner surface of the sleeve 111. The suspension arm 12 includes a connecting portion 121 being disposed in the sleeve 111 and a limiting block 122 formed at a distal end of the connecting portion 121. The suspension arm 12 is rotatable relative to the extension arm 11 within a rotation angle range. Specifically, when the suspension arm 12 is rotated relative to the extension arm 11, the limiting block 122 is brought to contact one of two opposite side surfaces of the protruding block 112 to arrest rotation of the suspension arm 12 relative to the extension arm 11. However, the protruding block 112 and the sleeve 111 of the extension arm 11 are formed integrally, and the connecting portion 121 and the limiting block 122 of the suspension arm 12 are formed integrally. Thus, when the rotation angle range of the suspension arm 12 relative to the extension arm 11 is required to change, at least one of the extension arm 11 and the suspension arm 12 must be replaced.

SUMMARY

Therefore, an object of the disclosure is to provide a support arm device capable of alleviating the drawback of the conventional support arm device.

According to an aspect of the present disclosure, a support arm device is provided to include a support arm unit, a limiting member, and a positioning member. The support arm unit includes a tubular sleeve and a shaft. The tubular sleeve surrounds and extends along an axis. The shaft extends along the axis, is inserted into the tubular sleeve, and is rotatable about the axis relative to the tubular sleeve. The shaft has an outer surface that is formed with an annular sliding groove extending in the circumferential direction and surrounding the axis. A wall defining a bottom of the annular sliding groove has two limiting shoulder surface portions that are spaced apart from each other in a circumferential direction surrounding the axis and that define a deepened engaging groove section of the annular sliding groove therebetween. The limiting member is detachably interposed between the tubular sleeve and the shaft, is disposed in the annular sliding groove, and has two abutting surfaces and two stopping surfaces. The abutting surfaces respectively correspond in position to the limiting shoulder surface portions. Each of the abutting surfaces is rotatable to contact a corresponding one of the limiting shoulder surface portions so as to allow for co-rotation of the limiting member and the shaft in the tubular sleeve. The stopping surfaces are disposed respectively at two opposite ends of the limiting member and are respectively adjacent to the abutting surfaces. The positioning member extends removably through a wall of the tubular sleeve into the annular sliding groove for preventing removal of the shaft from the tubular sleeve and limiting rotation of the shaft relative to the tubular sleeve between two points, at each of which a respective one of the stopping surfaces contacts the positioning member. When the limiting member is detached from the annular sliding groove the shaft is rotatable freely relative to the tubular sleeve.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
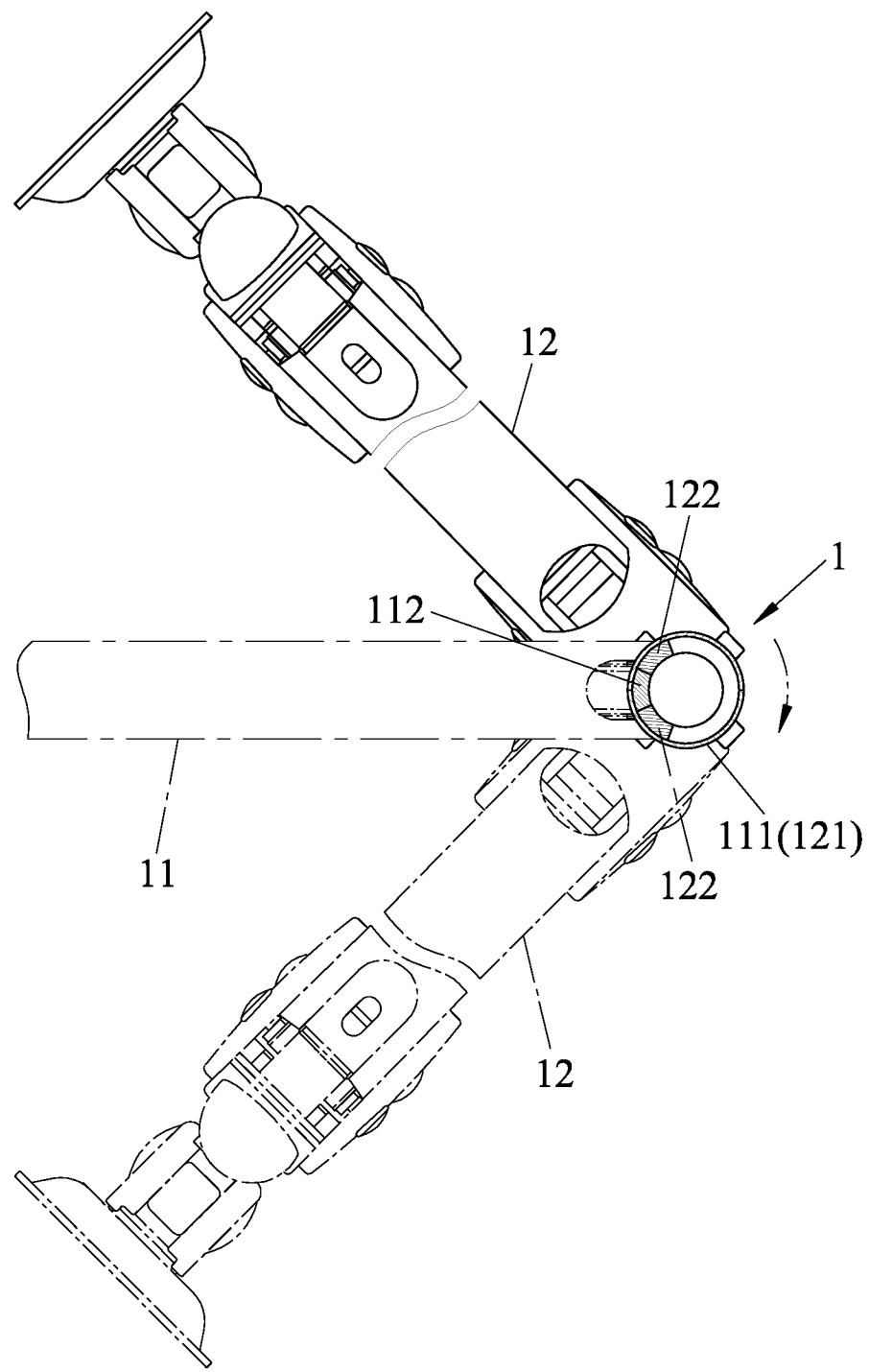
FIG. 1 is a schematic diagram of a conventional support arm device disclosed in Chinese Utility Model Patent No. 2768153.

Before the present disclosure is described in greater detail with reference to the accompanying embodiments, it should be noted herein that like elements are denoted by the same reference numerals throughout the disclosure.

Figure 2:
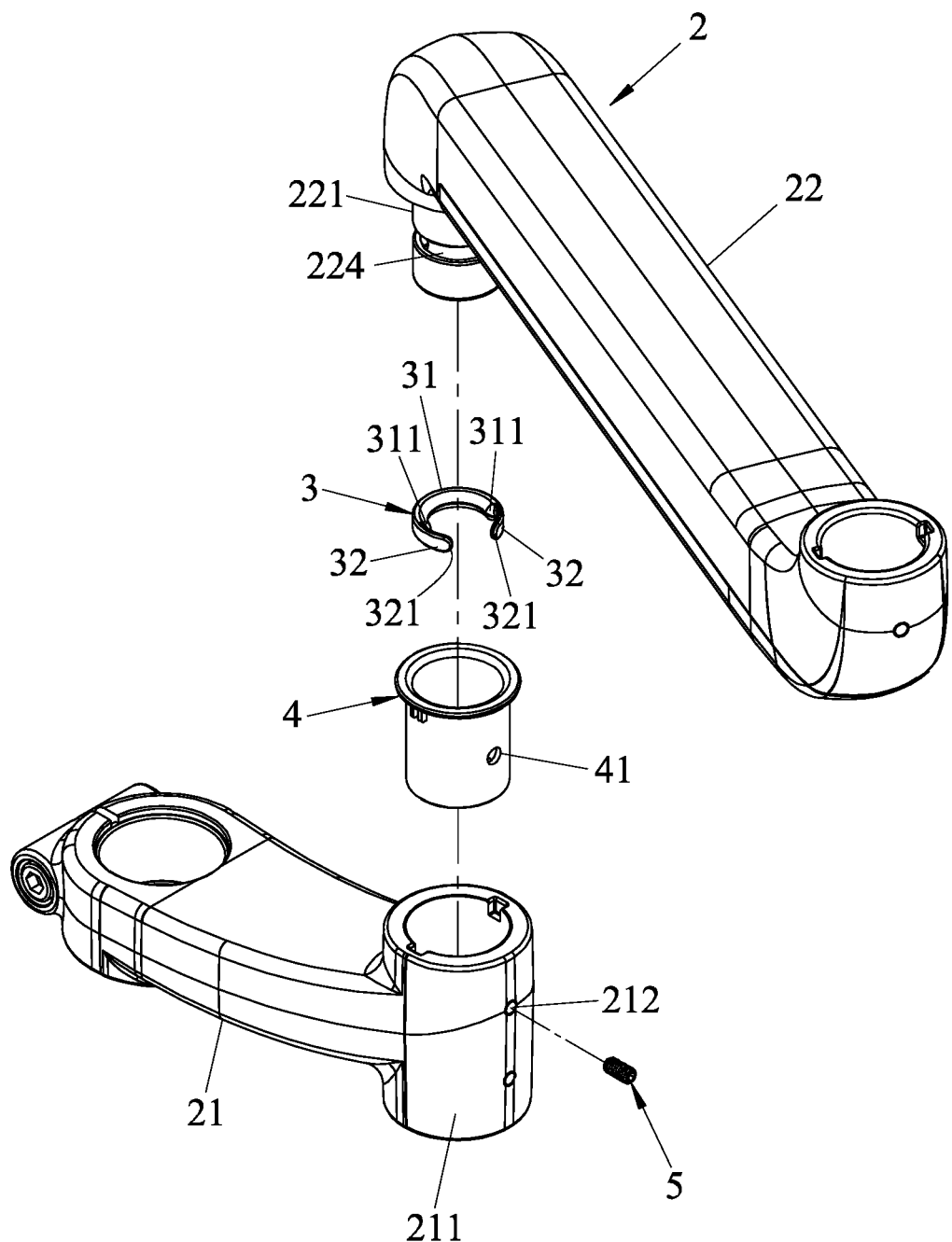
FIG. 2 is an exploded perspective view of a support arm device according to a first embodiment of the present disclosure.
Figure 3:
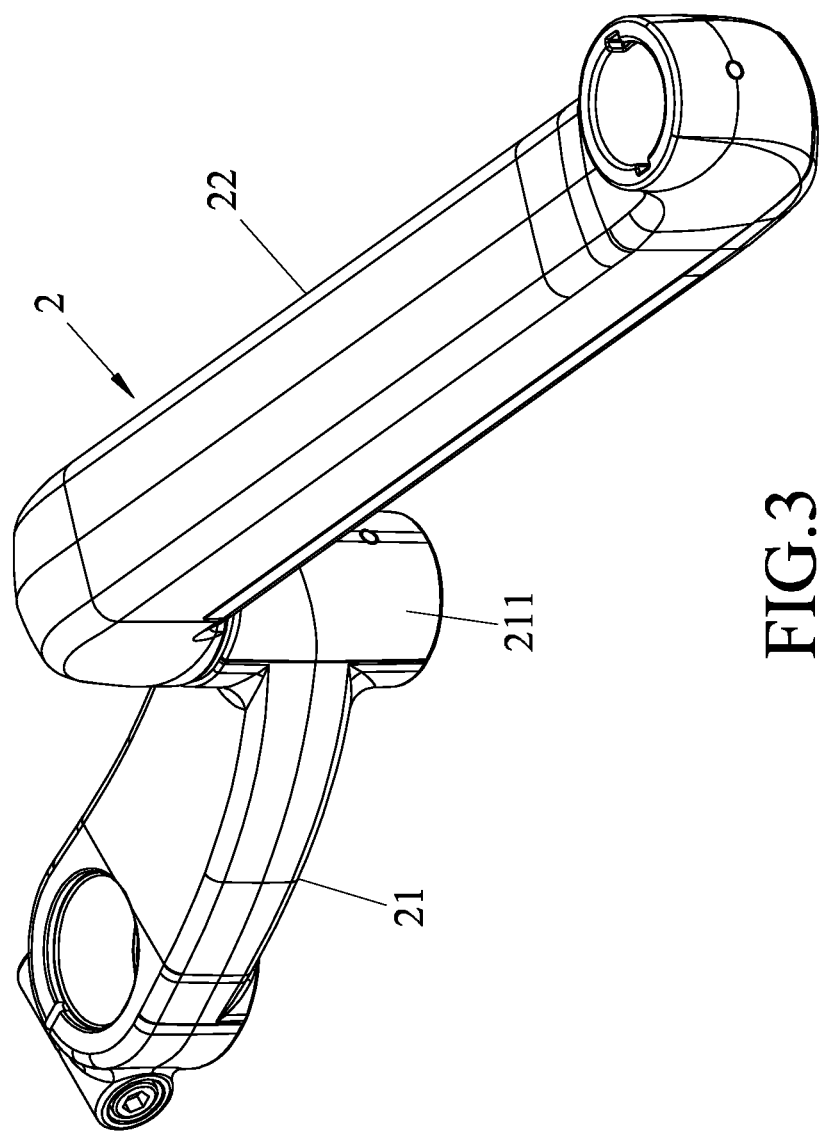
FIG. 3 is a schematic perspective view of the support arm device of the first embodiment.
Figure 4:
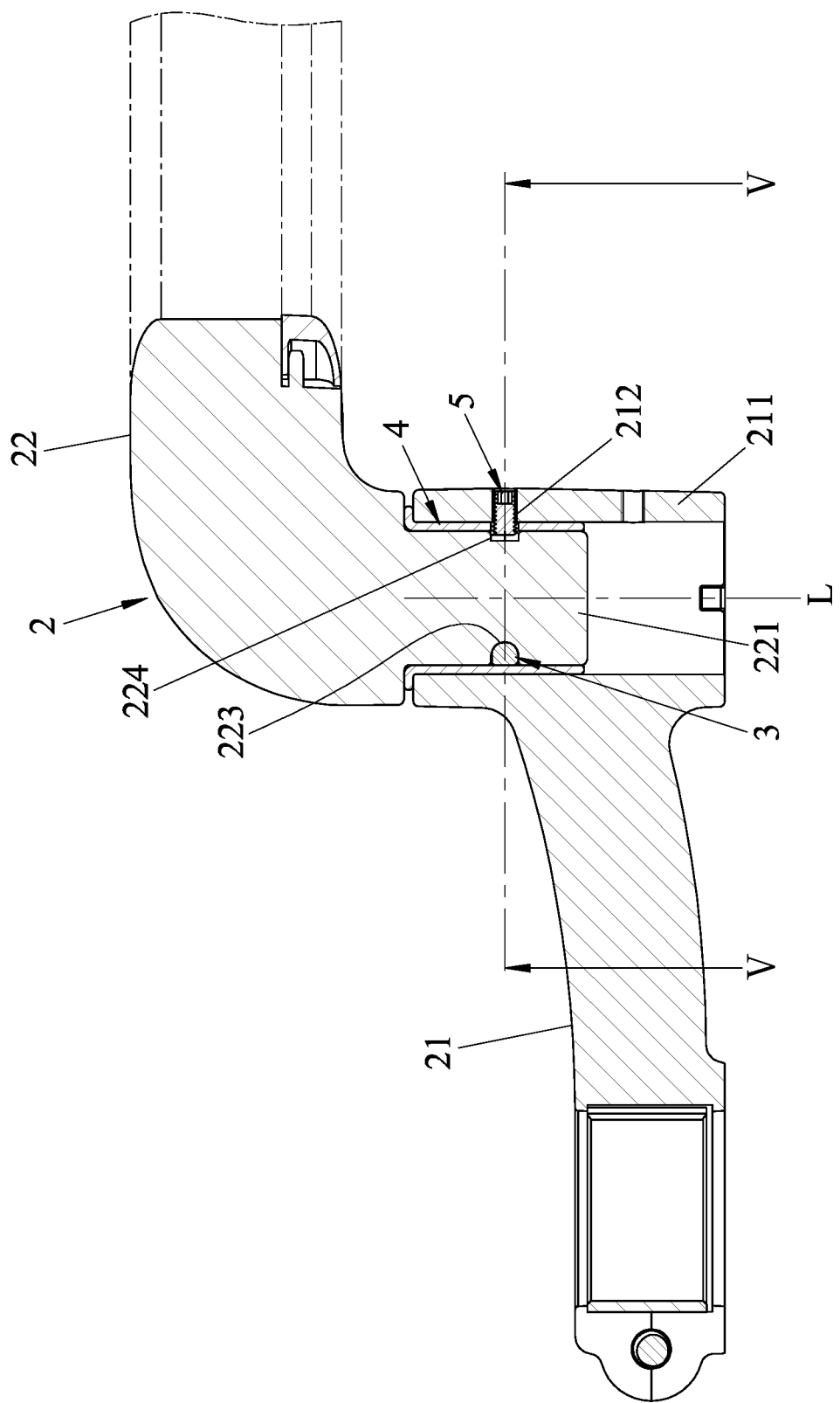
FIG. 4 is a schematic sectional view of the support arm device of the first embodiment.

Referring to FIGS. 2 to 4, a support arm device according to a first embodiment of the present disclosure is shown. The support arm device includes a support arm unit 2, a limiting member 3, a bushing 4, and a positioning member 5.

The support arm unit 2 includes an extension arm 21, a tubular sleeve 211, a suspension arm 22, and a shaft 221. The extension arm 21 extends from the tubular sleeve 211. The tubular sleeve 211 surrounds and extends along an axis (L) and is formed with a threaded hole 212. The suspension arm 22 extends from the shaft 221. The shaft 221 extends along the axis (L), is inserted into the tubular sleeve 211, and is rotatable about the axis (L) relative to the tubular sleeve 211.

Figure 5:
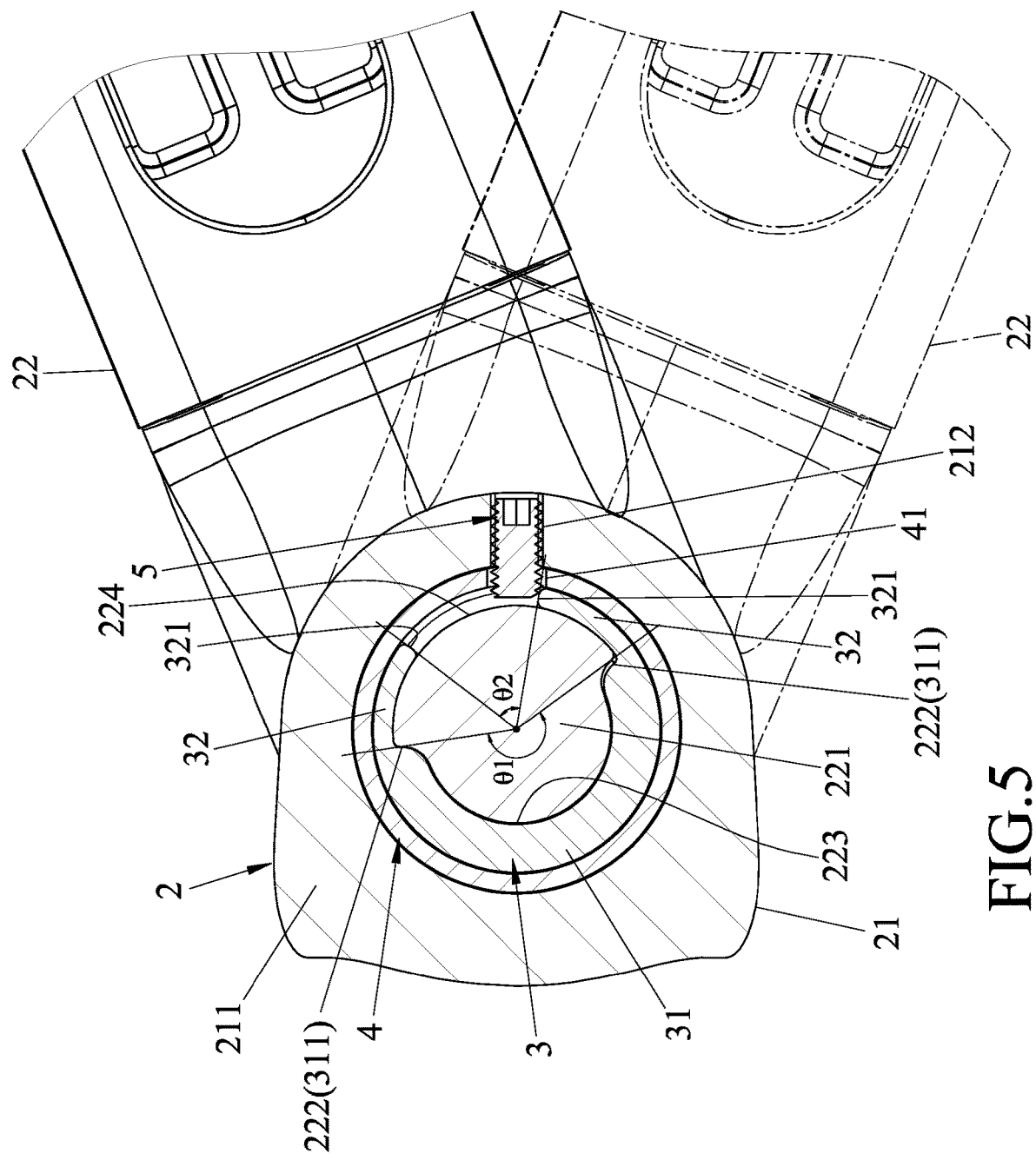
FIG. 5 is a sectional view taken along line V-V in FIG. 4, illustrating an extension arm rotatable relative to a suspension arm of the support arm unit of the first embodiment by an angle smaller than 45 degrees.

Further referring to FIG. 5, the shaft 221 has an outer surface formed with an annular sliding groove 224 extending in a circumferential direction surrounding the axis (L). A wall defining a bottom of the annular sliding groove 224 has two limiting shoulder surface portions 222 that are spaced apart from each other in the circumferential direction and that define a deepened engaging groove section 223 of the annular sliding groove 224 therebetween. The engaging groove section 223 has a first depth in a radial direction and the remaining portion of the annular sliding groove 224 has a second depth in a radial direction smaller than half the first depth.

The limiting shoulder surface portions 222 of the shaft 221 define a first included angle ($\theta 1$) therebetween ranging from 180 degrees to 210 degrees. In this embodiment, the first included angle ($\theta 1$) equals to 210 degrees.

The limiting member 3 is interposed between the tubular sleeve 211 and the shaft 221, is disposed in the annular sliding groove 224, and includes an engaging portion 31 and two extension portions 32. The engaging portion 31 engages fittingly the engaging groove section 223. The extension portions 32 extend respectively from two circumferentially opposite ends of the engaging portion 31 in the circumferential direction. The limiting member 3 has two abutting surfaces 311 respectively correspond in position to the limiting shoulder surface portions 222, and two stopping surfaces 321. Each of the abutting surfaces 311 is rotatable to contact a corresponding one of the limiting shoulder surface portions 222 so as to allow for co-rotation of the limiting member 3 and the shaft 221 in the tubular sleeve 211.

The stopping surfaces 321 are disposed respectively at two opposite ends of the limiting member 3, are respectively adjacent to the abutting surfaces 311, and define a second included angle ($\theta 2$) therebetween ranging from 45 degrees to 135 degrees. In this embodiment, the stopping surfaces 321 are disposed respectively at distal ends of the extension portions 32 of the limiting member 3 and the second included angle ($\theta 2$) equals to 45 degrees. Note that the allowable maximum rotation angle of the shaft 221 relative to the tubular sleeve 211 is slightly smaller than 45 degrees due to the diameter of the positioning member 5.

The bushing 4 is disposed between the tubular sleeve 211 and the limiting member 3, and is formed with a through hole 41. The through hole 41 corresponds in position to the threaded hole 212 of the tubular sleeve 211 in a radial direction.

The positioning member 5 threadedly engages the threaded hole 212 of the tubular sleeve 211 and extends through the through hole 41 of the bushing 4 into the annular sliding groove 224 of the shaft 221 to for preventing removal of the shaft 221 from the tubular sleeve 211 and limiting rotation of the shaft 221 relative to the tubular sleeve 211. Specifically, when the positioning member 5 extends into the annular sliding groove 224 but does not press against the tubular sleeve 211, the shaft 221 is rotatable relative to the tubular sleeve 211 between two points, at each of which a corresponding one of the stopping surfaces 321 contacts the positioning member 5. In this embodiment, the shaft 221 is rotatable relative to the tubular sleeve 211 by an angle smaller than the second included angle ($\theta 2$), i.e., 45 degrees defined between the stopping surfaces 321.

When the limiting member 3 is detached from the annular sliding grove 224, the shaft 221 is rotatable freely relative to the tubular sleeve 211. Note that the positioning member 5 is a countersunk bolt detachably and threadedly engaging the threaded hole 212.

Figure 6:
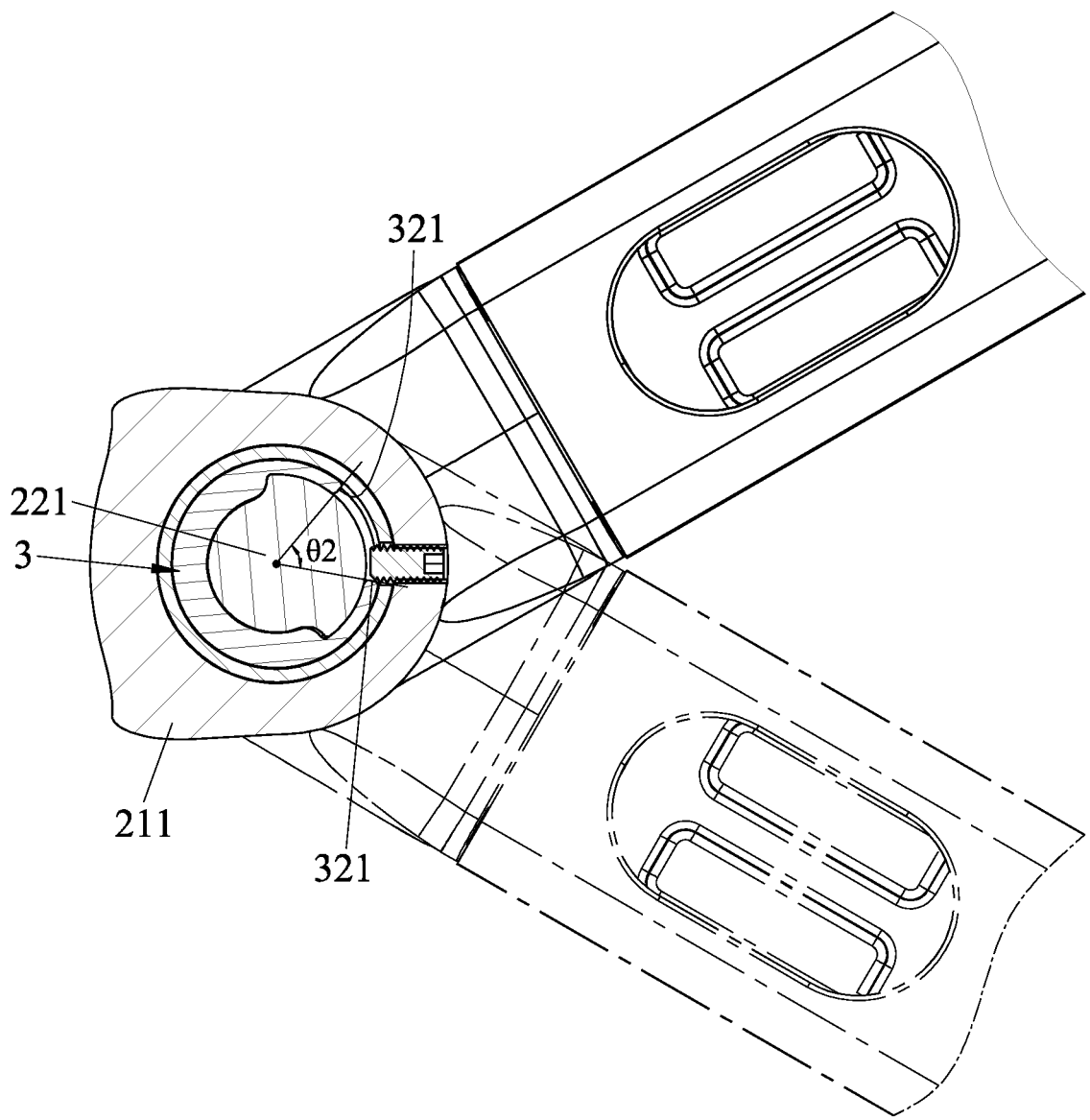
FIG. 6 is a sectional view similar to FIG. 5, but illustrating a limiting member of the support arm device of the first embodiment being modified and the extension arm rotatable relative to the suspension arm by an angle smaller than 60 degrees.
Figure 7:
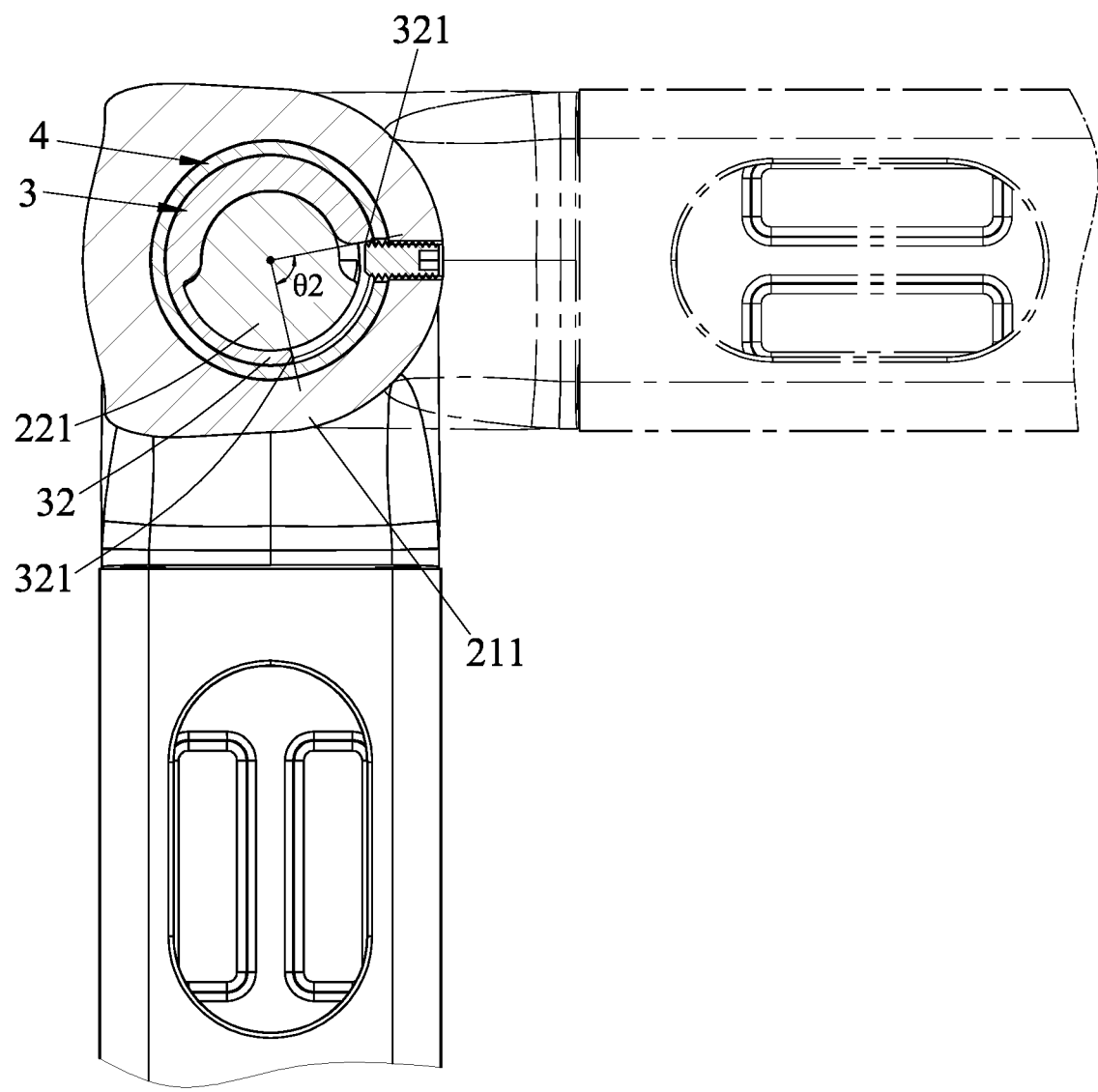
FIG. 7 is a sectional view similar to FIG. 5, but illustrating another modification of the limiting member and the extension arm rotatable relative to the suspension arm by an angle smaller than 90 degrees.

Referring to FIGS. 6 and 7, two modifications of the limiting member 3 are respectively shown. In FIG. 6, a distance between the stopping surfaces 321 of the limiting member 3 in the circumferential direction is increased (i.e., the length of the limiting member 3 is reduced), and thus the maximum rotation angle of the shaft 221 relative to the tubular sleeve 211 is modified to slightly smaller than 60 degrees. As shown in FIG. 7, the right one of the extension portions 32 of the limiting member 3 is omitted, and the length of the left one of the extension portions 32 of the limiting member is increased, such that a distance between the stopping surfaces 321 in the circumferential direction is increased. The second included angle ($\theta 2$) defined between the stopping surfaces 321 is modified to 90 degrees. Note that the second included angle ($\theta 2$) is not limited to the examples described in this disclosure and may be modified according to user demand.

Figure 8:
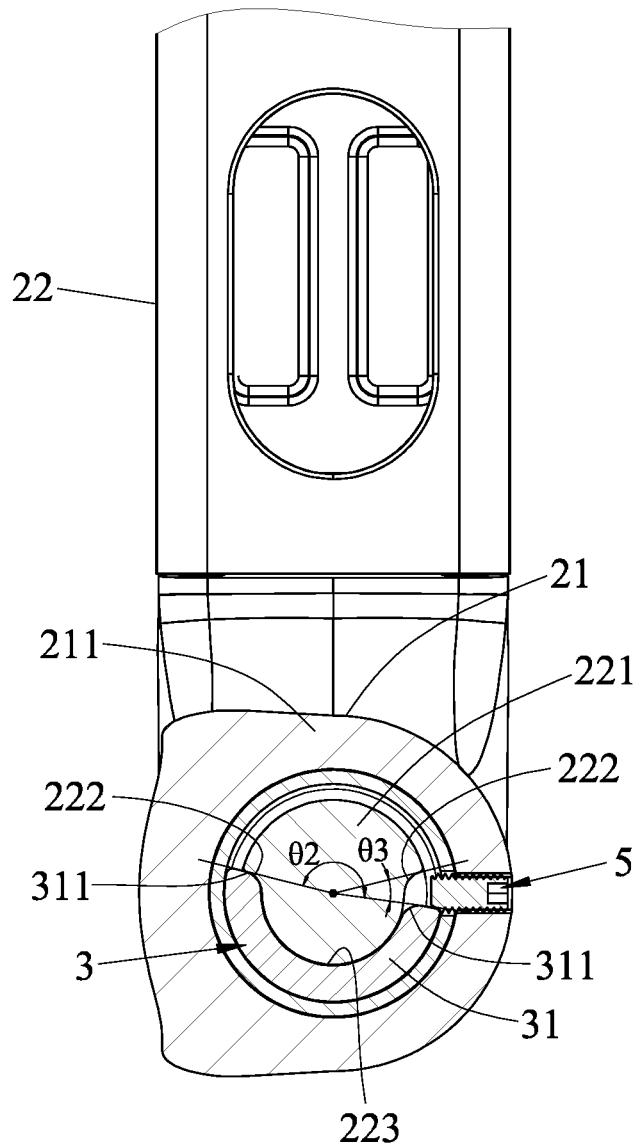
FIG. 8 is a schematic sectional view of the support arm unit of a second embodiment of the present disclosure.
Figure 9:
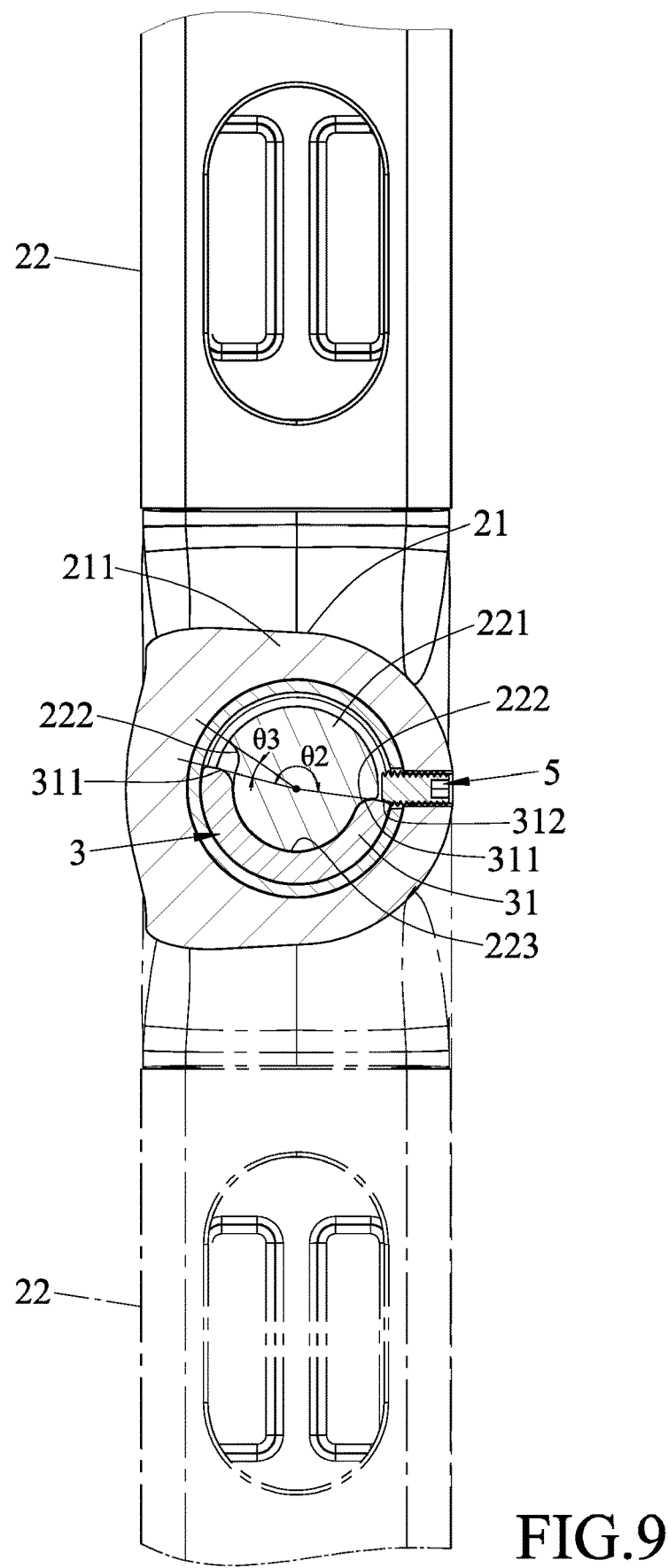
FIG. 9 is a schematic sectional view illustrating an allowable maximum rotation angle of the extension arm relative to the suspension arm of the second embodiment being more than 180 degrees.

Referring to FIGS. 8 and 9, the support arm device according to a second embodiment is shown. The second embodiment is similar to the first embodiment but the difference therebetween resides in the following. In the second embodiment, the extension portions 32 of the limiting member 3 shown in FIG. 5 are omitted and the limiting member 3 only includes the engaging portion 31 slidably inserted in the engaging groove section 223. The engaging portion 31 has two circumferentially opposite ends respectively formed with the stopping surfaces 321. That is to say, in this embodiment, the abutting surfaces 311 of the limiting member 3 also serve as the stopping surfaces, respectively.

In this embodiment, as shown in FIG. 8, when the left abutting surface 311 abuts against the left limiting shoulder surface portion 222, the right abutting surface 311 is angularly spaced apart from the right limiting shoulder surface portion 222 by a third included angle ($\theta 3$). As such, the shaft 221 is rotatable relative to the limiting member 3 by an angle of the third included angle ($\theta 3$). Thus, the allowable maximum rotation angle of the shaft 221 relative to the tubular sleeve 211 is slightly smaller than ($\theta 2+\theta 3$) due to the diameter of the positioning member 5.

As shown in FIG. 9, when the right limiting shoulder surface portion 222 is brought to contact the right abutting surface 311, the limiting member 3 can co-rotate with the shaft 221 relative to the tubular sleeve 211 in a clockwise direction.

In this embodiment, the second included angle ($\theta 2$) is 180 degrees and the third included angle ($\theta 3$) is 30 degrees, thus the maximum rotation angle of the shaft 221 relative to the tubular sleeve 211 is slightly smaller than 210 degrees.

Figure 10:
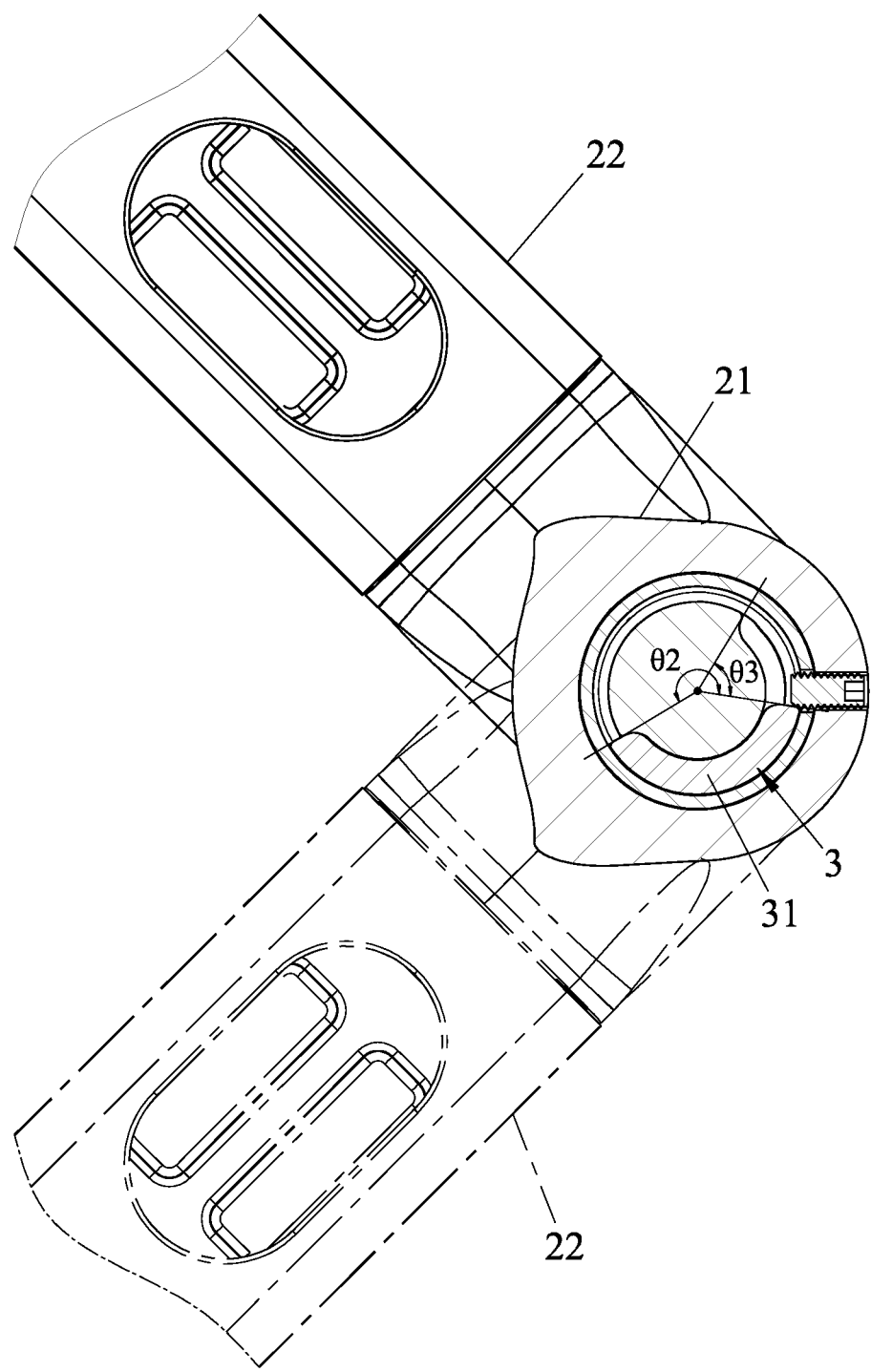
FIG. 10 is a schematic sectional view similar to FIG. 9, but illustrating the limiting member being modified and the allowable maximum rotation angle of the extension arm relative to the suspension arm being more than 270 degrees.
Figure 11:
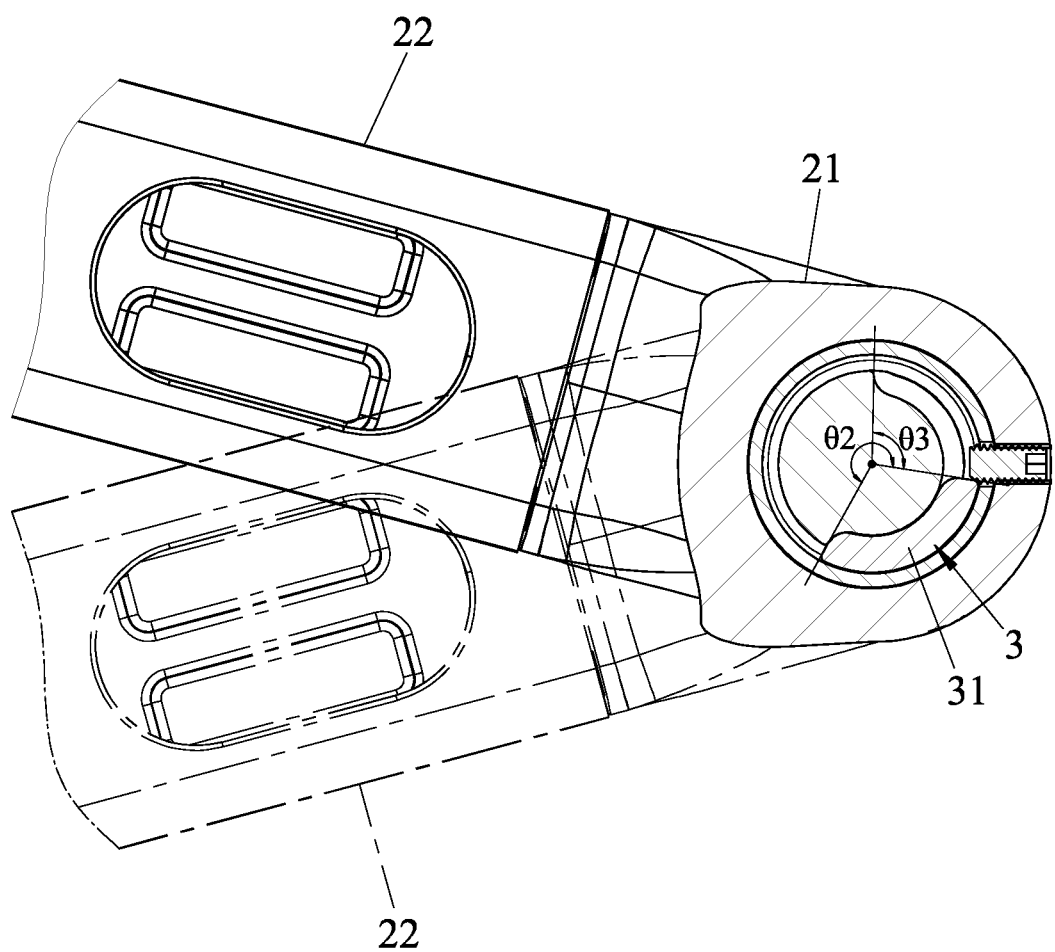
FIG. 11 is a schematic sectional view similar to FIG. 9, but illustrating another modification of the limiting member and the allowable maximum rotation angle of the extension arm relative to the suspension arm being more than 330 degrees.

Note that when the suspension arm 22 is fixed, the extension arm 21 is rotatable relative to the suspension arm 22 in a similar manner. It should be noted that, similar to the first embodiment, the suspension arm 22 may be rotated relative to the extension arm 21 in different angles by modifying the engaging portion 31 of the limiting member 3. For example, as shown in FIGS. 10 and 11, the engaging portion 31 of the limiting member 3 is modified. Thus, the allowable maximum rotation angle of the suspension arm 22 relative to the extension arm 21 is more than 270 degrees (θ2) or more than 330 degrees (θ2).

Figure 12:
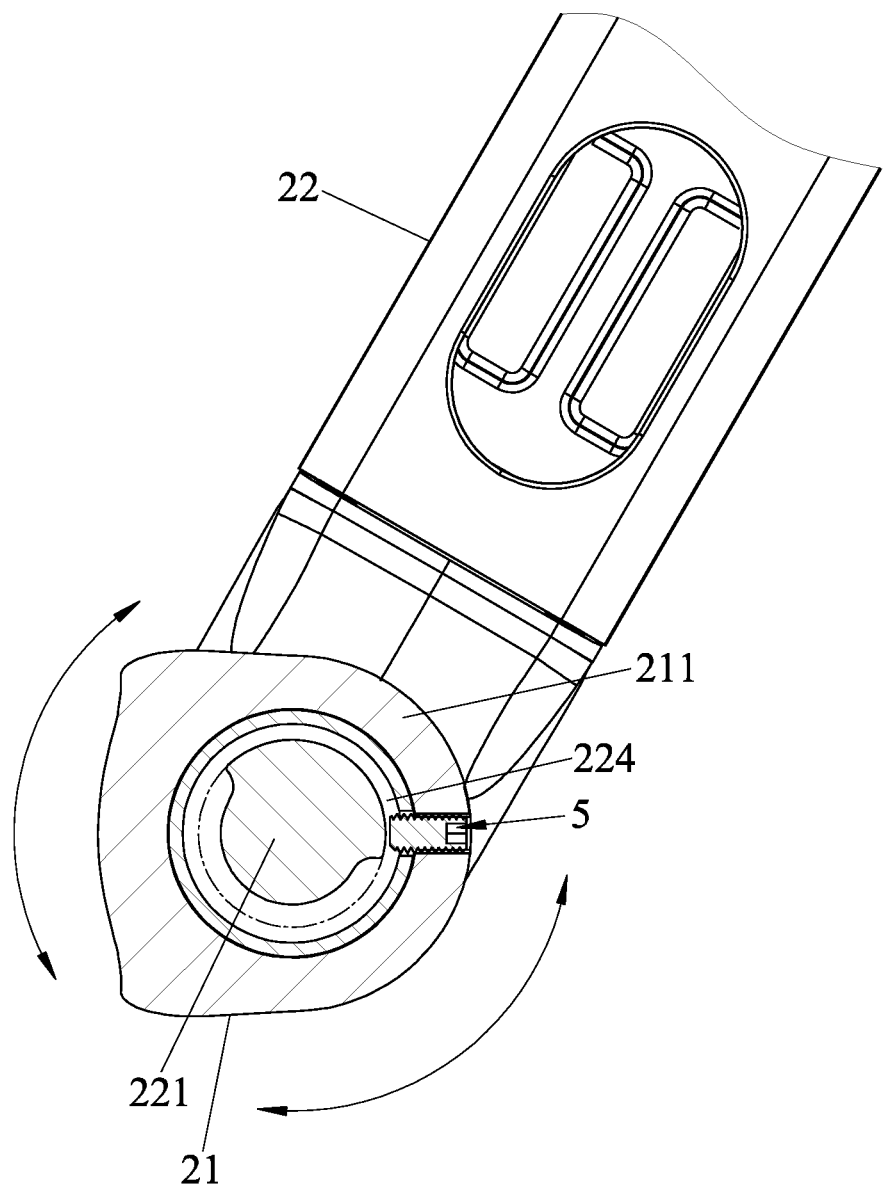
FIG. 12 is a schematic sectional view similar to FIG. 9, but illustrating the limiting member being detached and the extension arm rotatable relative to the suspension arm freely.

Further referring to FIG. 12, when the limiting member 3 shown in FIGS. 8-11 is removed from the support arm unit 2, and the positioning member 5 extends into the annular sliding groove 224 but does not press against the tubular sleeve 211, the suspension arm 22 is rotatable relative to the extension arm 21 freely.

By virtue of the limiting member 3 that can be replaced to provide different included angles between the stopping surfaces 321, the allowable maximum rotation angle of the shaft 221 relative to the tubular sleeve 211 can be adjusted easily according to user demand. positioning member In the description above, for the purposes of explanation, numerous specific details have been set forth in order to provide a thorough understanding of the embodiment. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A support arm device, comprising:
    a support arm unit including
        a tubular sleeve surrounding and extending along an axis, and
        a shaft extending along the axis, inserted into said tubular sleeve, rotatable about the axis relative to said tubular sleeve, and having an outer surface that is formed with an annular sliding groove extending in the circumferential direction and surrounding the axis, a wall defining a bottom of said annular sliding groove having two limiting shoulder surface portions that are spaced apart from each other in a circumferential direction surrounding the axis and that define a deepened engaging groove section of said annular sliding groove therebetween;
    a limiting member detachably interposed between said tubular sleeve and said shaft, disposed in said annular sliding groove, and having
        two abutting surfaces respectively corresponding in position to said limiting shoulder surface portions, and each rotatable to contact a corresponding one of said limiting shoulder surface portions so as to allow for co-rotation of said limiting member and said shaft in said tubular sleeve, and
        two stopping surfaces disposed respectively at two opposite ends of said limiting member and respectively adjacent to said abutting surfaces; and
    a positioning member extending through a wall of said tubular sleeve into said annular sliding groove for preventing removal of said shaft from said tubular sleeve and limiting rotation of said shaft relative to said tubular sleeve between two points, at each of which a respective one of said stopping surfaces contacts said positioning member, when said limiting member is detached from said annular sliding groove said shaft being rotatable freely relative to said tubular sleeve.

2. The support arm device as claimed in claim 1, wherein said limiting shoulder surface portions of said shaft define a first included angle therebetween ranging from 180 degrees to 210 degrees.

3. The support arm device as claimed in claim 2, wherein said stopping surfaces of said limiting member define a second included angle therebetween ranging from 45 degrees to 135 degrees.

4. The support arm device as claimed in claim 1, wherein said engaging groove section has a first depth in a radial direction and the remaining portion of said annular sliding groove has a second depth in the radial direction smaller than half the first depth, said limiting member including an engaging portion engaging fittingly said engaging groove section.

5. The support arm device as claimed in claim 4, wherein said engaging portion of said limiting member has two circumferentially opposite ends respectively formed with said stopping surfaces.

6. The support arm device as claimed in claim 4, wherein said limiting member further includes two extension portions extend respectively from two circumferentially opposite ends of said engaging portion in the circumferential direction and respectively formed with said stopping surfaces at two distal ends of said extension portions.

7. The support arm device as claimed in claim 4, wherein said engaging portion of said limiting member is slidably inserted in said engaging groove section.

8. The support arm device as claimed in claim 1, further comprising a bushing disposed between said tubular sleeve and said limiting member and formed with a through hole, said tubular sleeve being formed with a threaded hole corresponding in position to said through hole, said positioning member threadedly engaging said threaded hole and extending through said through hole into said annular sliding groove of said shaft.

9. The support arm device as claimed in claim 8, wherein said positioning member is a countersunk bolt detachably and threadedly engaging said threaded hole.

10. The support arm device as claimed in claim 1, wherein said support arm unit includes an extension arm extending from said tubular sleeve and a suspension arm extending from said shaft.

* * * * *